United States Patent Office 3,101,253
Patented Aug. 20, 1963

3,101,253
PROCESS FOR THE MANUFACTURE OF CHLORINE DIOXIDE
Rudolf Hirschberg, Frankfurt am Main, Germany, assignor to Farbwerke Hoechst Aktiengesellschaft, vormals Meister Lucius & Brüning, Frankfurt am Main, Germany, a corporation of Germany
No Drawing. Filed July 20, 1960, Ser. No. 43,982
Claims priority, application Germany Aug. 7, 1959
5 Claims. (Cl. 23—152)

The present invention relates to a process for the manufacture of chlorine dioxide by reducing alkali metal or alkaline earth metal chlorates with hydrochloric acid.

It is known that chlorates react with hydrochloric acid either according to Equation 1 or according to Equation 2:

(1) $ClO_3^- + 2HCl \rightarrow ClO_2 + \frac{1}{2}Cl_2 + Cl^- + H_2O$
(2) $ClO_3^- + 6HCl \rightarrow 3Cl_2 + Cl^- + 3H_2O$ The reaction according to Equation 1 leads to the desired chlorine dioxide whereas the reaction according to Equation 2 takes place as undesired side-reaction. The higher the proportion of Reaction 2 in the total reaction, the lower the yield of chlorine dioxide and the higher the consumption of hydrochloric acid and the production of chlorine. Even a relatively low proportion of Reaction 2 in the total reaction considerably increases the consumption of hydrochloric acid and contaminates the chlorine dioxide formed with high amounts of chlorine. This fact is particularly disadvantageous when the chlorine dioxide produced is intended for use in the manufacture of sodium chlorite, in which case the accompanying chlorine must be separated. The smaller the amount of chlorine carried along by the chlorine dioxide, the easier will be the separation of chlorine dioxide and chlorine. For a rational manufacture of chlorine dioxide by reducing, for example, sodium or calcium chlorate with hydrochloric acid, it is therefore important to keep the proportion of the undesired Side-Reaction 2 in the total reaction as low as possible.

A known process for the manufacture of chlorine dioxide consists in transforming an aqueous suspension of calcium hydroxide into a solution of calcium chlorate by treating it with gaseous chlorine and then reacting the solution of calcium chlorate with hydrochloric acid to obtain chlorine dioxide and chlorine. In the most favorable case, however, yields of chlorine dioxide of 80% are obtained, calculated on the chlorate used, while the residual 20% react according to Equation 2 with the sole formation of chlorine (U.S. Patent 2,280,938). This implies according to the above equations that the chlorine dioxide formed carries along chlorine on the average in a molar proportion $Cl_2:ClO_2$ of 1.25 whereas if the reaction takes place entirely according to Equation 1 the proportion $Cl_2:ClO_2$ should be 0.5. Simultaneously, 3.5 mols HCl are required per mol of chlorine dioxide formed, while according to Equation 1 only 2.0 mols HCl would be necessary per mol chlorine dioxide.

The proportions of Reactions 1 and 2 in the total reaction are not constant in the course of the reaction; at the beginning especially the reaction according to Equation 1 takes place, whereas at the end, when the reaction solution only contains little chlorate, the reaction mainly takes place as indicated in Equation 2. Some known processes make use of this phenomenon. They are carried out in a manner such that only part, for example 70–80% and not the total amount, of the chlorate first introduced into the reaction vessel is reacted with hydrochloric acid. The unexhausted chlorate solution is then removed from the reaction vessel and either abandoned or freed from the chloride formed by crystallization processes, concentrated, again admixed with fresh chlorate and reconducted into the reaction vessel. Furthermore, processes are known wherein the partially exhausted chlorate solution, after having been concentrated, is again enriched with chlorate by electrolysis and then reconducted into the reaction vessel. Finally processes are known in which the chlorate to be reacted is dissolved in a non oxidizable acid, for example sulfuric acid, prior to the addition of hydrochloric acid or a chloride.

In this manner it is possible to increase the proportion of Reaction 1 to 90–94% of the total reaction and to repress the formation of chlorine in favor of that of chlorine dioxide. However, the disadvantage of said known processes resides in the fact that either a loss of chlorate occurs by abandoning part of the chlorate used or that they require extensive and partially expensive auxiliary devices such as electrolysis, cooling and vacuum installations, and complicated processes, such as crystallizations and concentrations. The processes carried out with reconduction of the chlorate furthermore involve the disadvantage that the calcium chlorate obtained by an economical process from calcium hydroxide and chlorine cannot be used and that the chlorine necessarily formed cannot be utilized again in the process. The processes carried out with the addition of a non oxidizable acid possess the disadvantage that only chloride-free chlorate can be used and that calcium chlorate which has been produced, for example, from chlorine and calcium hydroxide is unsuitable on account of its high chloride content. Moreover, in said known processes an additional acid is required, for example sulfuric acid.

The present invention provides a process for the manufacture of chlorine dioxide by reducing alkali metal or alkaline earth metal chlorates with hydrochloric acid in aqueous solution, wherein the reaction between chlorate and hydrochloric acid is carried out in the presence of manganese and/or silver ions. The reaction is suitably carried out at a temperature in the range from 0 to 100° C. and preferably from about 20 to about 70° C.

The process of the invention avoids the disadvantages of the known processes and gives a high yield of chlorine dioxide.

The process of the invention can be carried out, for example, in a manner such that the reaction solution is admixed with manganese chloride, for example $MnCl_2 \cdot 4H_2O$, manganese dioxide, silver nitrate, silver oxide or silver chloride so as to produce the manganese and/or silver ions. Especially suitable are concentrations of 0.5–1.5 g. $Mn^{+2}$ ions per liter of reaction solution or 0.05–0.3 g. $Ag^+$ ions per liter of reaction solution, concentrations outside said ranges being likewise possible. It has been found, for example, that with a complete reaction of the chlorate used with hydrochloric acid, a chlorine dioxide yield of about 95.3%, calculated on the chlorate, can be obtained using a calcium chlorate solution of about 0.65 mol $Ca(ClO_3)_2$ per liter, produced by chlorinating an aqueous suspension of lime and containing 0.55 g. $Mn^{+2}$ ions per liter. The molar proportion $Cl_2:ClO_2$ in the gas mixture produced is 0.636. As compared therewith, a yield of 78.7% only and a proportion of $Cl_2:ClO_2$ of 1.29 are obtained under otherwise identical conditions but in the absence of manganese ions. The presence of silver ions has the same favorable effect. When, for example, 0.216 g. $Ag^+$ ions are present per liter of reaction solution, a chlorine dioxide yield of 93.7% is obtained with a complete reaction of the chlorate used with hydrochloric acid, whereas in the absence of silver ions the yield obtained under otherwise identical conditions only amounts to 76.1%.

The catalytic activity of small additions of manganese ions, for example, in the form of $MnCl_2 \cdot 4H_2O$, diminishes as the reaction temperature decreases. It is therefore suitable to operate in the presence of manganese ions at a temperature above 35° C. The activity of silver ions is relatively independent of the temperature of the reaction solution.

A practical activity of manganese ions at low temperatures can be obtained by adding small amounts of silver ions to the reaction solution containing manganese ions. In this case amounts of silver ions are sufficient which, when used alone, would not yet have a strong action. For example, at a reaction temperature in the range from 16 to 19° C. and in the presence of 1.39 g. $Mn^{+2}$ ions per liter of reaction solution of calcium chlorate, a yield of chlorine dioxide of 80.3%, calculated on the chlorate, is obtained with a complete reaction of the chlorate with hydrochloric acid. When, however, 0.021 g. $Ag^+$ ions, for example in the form of silver nitrate, are added per liter of reaction solution, the yield is increased to 91.5% under otherwise identical conditions.

As compared with the known processes, the process of the invention represents a considerable advance since it permits reaction of the total amount of chlorate used in one reaction stage in a relatively simple manner and with a high yield of chlorine dioxide. The same or even higher yields are obtained than in processes in which the chlorate is only partially reacted and the unexhausted reaction solution is worked up, and which require additional expensive enrichment steps. A further advantage of the process of the invention resides in the fact that the reaction between the chlorate and hydrochloric acid can be carried out at convenient temperatures, preferably in the range from 20 to 70° C. In contradistinction thereto, most of the known processes are realized either at very low or at relatively high temperatures, for example at about −15° C. or at about +100° C., which, especially in the latter case, may involve difficulties on account of the high thermal instability of chlorine dioxide and the corrosive nature of the gases formed and the reaction solution. When a calcium chlorate/calcium chloride solution is used, as obtained in the chlorination of lime suspensions, the practically pure calcium chloride solution leaving the process furthermore represents a valuable by-product. If necessary, it can be freed without difficulty from the small amounts of catalyst contained therein, for example by a treatment with a small excess of lime and air.

For carrying out the process of the invention, in addition to calcium chlorate solutions obtained by chlorinating lime, other chlorates can be used with the same success, for example sodium chlorate or potassium chlorate or also chloride-free calcium chlorate solutions. In this case it is of special advantage to add to the reaction solution, prior to the reaction, chloride ions, such as sodium chloride or calcium chloride, approximately in a proportion of 0.5 to 10 mols chloride ions per mol of chlorate used.

The hydrochloric acid required for reducing the chlorate can be added to the solution in the form of aqueous hydrochloric acid or gaseous hydrogen chloride. Alternatively, the hydrochloric acid can be produced in situ in the reaction solution, for example, by adding a sodium chloride solution to a solution of chlorate in a non reducing acid, such as sulfuric acid, in the presence of manganese and/or silver ions. The process of the invention can furthermore be carried out by reacting hydrochloric acid and chlorate in the presence of a non oxidizable acid or in a manner such that, for obtaining a still better molar proportion of chlorine to chlorine dioxide produced, the chlorate and hydrochloric acid used are only incompletely reacted with one another. The process of the invention can be carried out either discontinuously or continuously. On account of the considerably higher yields at low concentrations, as compared with a process using catalyst-free solutions, it is of special advantage to carry out the process of the invention in continuous manner.

The process of U.S. Patent 2,172,434 in which an aqueous solution of manganese chlorate is subjected at high temperatures to a disproportionation to yield chlorine dioxide and manganese dioxide does not suggest the process of the present invention. In that patent manganese dioxide is separated and then reacted with hydrochloric acid to yield manganese chloride and chlorine. The characteristic feature of said known process consists in that several stages are required and that the molar ratio of manganese to chlorate is 1:2. The bivalent manganese used acts as reducing agent and must be regenerated in a second stage. The amounts of manganese required per mol of chlorine dioxide are so large that an abandonment of the manganese in the exhausted reaction solution is not admissible from an economical point of view. In contradistinction thereto the process of the invention is carried out in one stage, wherein hydrochloric acid is the reducing agent while the manganese and/or silver ions added catalytically accelerate and control the reaction between the reactants. The process of the invention can be carried out at low temperatures and the molar amounts of manganese or silver are smaller than 1% of the molar amount of chlorate used. Therefore, they must not be recovered without considerable economical disadvantages occurring.

The following examples serve to illustrate the invention, but they are not intended to limit it thereto.

*Example 1*

An aqueous suspension of calcium hydroxide was chlorinated to obtain a solution containing 135 grams $Ca(ClO_3)_2$ and 370 grams $CaCl_2$ per liter.

5 liters of said solution were introduced into a reaction vessel and 10 grams $MnCl_2.4H_2O$ (0.55 gram $Mn^{+2}$; $Mn^{+2}:ClO_3^-=0.0077:1$) were added. In the course of 7.25 hours a total of 1.57 liters HCl (10.0 N) was added, while simultaneously 1.1 m.³ air were blown into the solution per hour through a gas distribution device to dilute the chlorine dioxide produced. During the reaction the temperature amounted to 70° C. The mixture of chlorine dioxide, chlorine and air leaving the reaction vessel was introduced into an aqueous sodium peroxide solution in order to determine in usual manner the amounts of gas produced. The reaction being terminated the solution contained 562.5 grams $NaClO_2$ and 462.5 grams NaCl. The yied of chlorine dioxide, calculated on the chlorate used, was 95.3% and the molar ratio of chlorine to chlorine dioxide in the gas produced was 0.636:1.

*Example 2*

The experiment was carried out as described in Example 1 with the exception that no manganese chloride was added. The reaction lasted for 9.6 hours and 2.08 liters HCl (10 N) were required. The chlorine dioxide yield amounted to 78.7% and the molar ratio of chlorine to chlorine dioxide was 1.3:1.

*Example 3*

5 liters of a solution, prepared as described in Example 1, of 138 grams $Ca(ClO_3)_2$ and 385 grams $CaCl_2$ per liter were admixed in a reaction vessel with 100 cc. of a 1/10 N $AgNO_3$ solution (0.216 gram $Ag^+$ per liter of reaction solution; $Ag^+:ClO_3^-=0.0015:1$) and then treated within 2.17 hours with a total amount of 1.74 liters HCl (10 N). The reaction temperature was 70° C.; for diluting the gases formed 2.2 m.³ air were blown into the reaction solution per hour. The absorption vessel charged with sodium peroxide solution contained at the end of the reaction 565 grams $NaClO_2$ and 498.5 grams NaCl. The yield of chlorine dioxide, calculated on the chlorate used, amounted to 93.7% and the molar ratio of chlorine to chlorine dioxide was 0.682:1.

*Example 4*

The experiment was carried out as described in Example 3, with the exception that no silver nitrate solution was used. The reaction lasted for 2.86 hours and 2.295 liters HCl (10 N) were required. The yield of chlorine dioxide was 76.1% and the ratio of $Cl_2:ClO_2$ was 1.36:1.

Example 5

10 grams $MnCl_2.4H_2O$ (0.55 gram $Mn^{+2}$/liter reaction solution; $Mn^{+2}:ClO_3^- = 0.0079:1$) were added to 5 liters of an aqueous solution of sodium chlorate containing per liter 135.0 grams $NaClO_3$ and the solution was reacted in a reaction vessel at a temperature of 70° C. within 11.25 hours with a total amount of 2.34 liters HCl (10 N) while simultaneously passing through 1.1 m.³ air per hour. The gases formed were introduced into an absorption vessel charged with sodium peroxide solution which contained at the end of the reaction 521 grams $NaClO_2$ and 539 grams NaCl. The chlorine dioxide yield, calculated on the chlorate used, was 90.9% and the molar ratio $Cl_2:ClO_2$ was 0.8:1.

Example 6

The experiment was carried out as described in Example 5 with the exception that no manganese chloride was added. The reaction lasted for 16.2 hours, 3.4 liters HCl (10 N) were required. The yield of chlorine dioxide amounted to 66.4% and the ratio $Cl_2:ClO_2$ was 1.97:1.

Example 7

5 liters of a solution prepared as described in Examples 1 and 3 and containing per liter 138 grams $Ca(ClO_3)_2$ and 385 grams $CaCl_2$ were admixed in a reaction vessel with 25 grams $MnCl_2.4H_2O$ (1.375 grams $Mn^{+2}$/liter reaction solution; $Mn^{+2}:ClO_3^- = 0.0188:1$) and 25 cc. $\frac{1}{10}$ N silver nitrate solution (0.054 gram $Ag^+$/liter reaction solution; $Ag^+:ClO_3^- = 0.000376:1$) and then a total amount of 1.99 liters HCl (10 N) were added in the course of 2.7 hours at a temperature of 40° C. In order to dilute the gases formed 2.2 m.³ air were blown per hour into the reaction solution. The gases produced were determined as described above by reacting them with a sodium peroxide solution. 572 grams $NaClO_2$ and 493 grams NaCl were obtained. The chlorine dioxide yield, calculated on the chlorate used, amounted to 94.8%. The molar ratio $Cl_2:ClO_2$ was 0.667:1.

Example 8

The experiment was carried out as described in Example 7 with the exception that no silver and manganese ions were added to the reaction solution. The reaction lasted for 3.6 hours, 2.6 liters HCl (10 N) were required. The chlorine dioxide yield was 79.9% and the molar ratio $Cl_2:ClO_2$ was 1.25:1.

Example 9

5 liters of a solution prepared as described in Examples 1, 3 and 7 and containing per liter 139 grams $Ca(ClO_3)_2$ and 387 grams $CaCl_2$ were admixed in a reaction vessel with 25 grams $MnCl_2.4H_2O$ (1.375 grams $Mn^{+2}$/liter reaction solution; $Mn^{+2}:ClO_3^- = 0.0187:1$) and 10 cc. $\frac{1}{10}$ N $AgNO_3$ solution (0.0216 gram $Ag^+$/liter reaction solution; $Ag^+:ClO_3^- = 0.00015:1$) and the whole was treated for 3.73 hours with 2.86 liters HCl (10 N) at a reaction temperature of 17–19° C. For diluting the gases formed 2.2 m.³ air were blown per hour into the reaction solution. The amounts of gases produced were determined as described above by reacting them with sodium peroxide solution. 556 grams $NaClO_2$ and 558 grams NaCl were obtained. The yield of chlorine dioxide corresponded to 91.5%, calculated on the chlorate used, and the molar ratio $Cl_2:ClO_2$ was 0.777:1.

Example 10

The experiment was carried out as described in Example 9 but without the addition of silver ions. The reaction lasted for 4.0 hours and 3.1 liters HCl (10 N) were required. On account of the low reaction temperature a yield of only 80.3% was obtained; the molar ratio $Cl_2:ClO_2$ was 1.24:1.

Example 11

An arrangement of 3 reaction vessels I, II and III was used, each having a capacity of about 8.0 liters of liquid, which were connected in series in a manner such that the reaction liquid could travel from vessel I via an overflow to vessel II and from there via another overflow to vessel III. The solution leaving vessel III was purged with air in a vessel IV (capacity about 1.5 liters) and discharged via a siphon.

The reaction liquid in vessels I–IV had a temperature of 71° C., 73° C., 76° C. and 74° C., respectively. Vessel I was charged per hour in doses with 2.36 liters calcium chlorate solution prepared in known manner by chlorinating an aqueous suspension of calcium hydroxide and containing about 149 grams $Ca(ClO_3)_2$ and 416 grams $CaCl_2$ per liter. Simultaneously about 0.12 liter of a catalyst solution was introduced per hour containing per liter 100 grams $MnCl_2.4H_2O$, 40 cc. $\frac{1}{10}$ N $AgNO_3$ solution, 160 grams $CaCl_2$ and 10 cc. concentrated HCl (in order to maintain the silver in solution as complex compound). By means of gas distribution devices 1.3, 0.8, 0.8 and 0.1 cubic meter, respectively, of air were blown per hour into reaction liquids in vessels I–IV, which air was each time admixed with gaseous hydrogen chloride (except for the air introduced in vessel IV) so that the chlorate concentrations amounted in vessel I to about 45–48 grams/liter, in vessel II to about 12–13 grams/liter and in vessel III to about 2–4 grams/liter $Ca(ClCO_3)_2$.

The air blown into vessels I–IV was conducted in countercurrent with the chlorate solution through the vessels and then introduced into sodium peroxide solution in order to determine the chlorine dioxide yield in known manner. In the course of 3 hours 819 grams $NaClO_2$, corresponding to a yield of 89% calculated on the chlorate used, and 786 grams NaCl were obtained. The molar proportion of $Cl_2:ClO_2$ in the gas was 0.742:1.

Example 12

The experiment was carried out as described in Example 11, but without the addition of catalyst solution. In the course of 3 hours 579 grams $NaClO_2$, corresponding to a yield of chlorine dioxide of 62.7% calculated on the chlorate used, and 1.448 grams NaCl were obtained. The molar proportion $Cl_2:ClO_2$ in the gas was 1.94:1.

Example 13

A reaction vessel provided with overflow and having a capacity of about 8.0 liters of liquid was charged in doses and per hour with 571 cc. of an aqueous chlorate solution containing 554 grams $NaClO_3$ per liter, 477 cc. $H_2SO_4$ of 78% strength) and 1.134 liters of a solution containing 321.5 grams NaCl and 10 grams $MnSO_4.H_2O$ per liter. For diluting the chlorine dioxide formed 1.5 cubic meters air were blown per hour into the reaction liquid. The excess reaction solution flowing off was purged with 0.3 cubic meter air per hour in a second vessel having a capacity of about 3 liters of liquid, and discharged via a siphon. The amounts of air blown in were combined and introduced into sodium peroxide solution in order to determine in usual manner the chlorine dioxide formed. The temperature in the reaction vessel was 70° C. and in the purging vessel 75° C. The acid concentration of the reaction liquid was about 3.6–4.0 N, the chlorate concentration was about 14 grams $NaClO_3$/liter in the reaction vessel and 3–4 grams per liter in the purging vessel.

In the course of 3 hours 689 grams $NaClO_2$, corresponding to a yield of 85.5% calculated on the chlorate used, and 676 grams NaCl were obtained. The molar proportion $Cl_2:ClO_2$ in the gas produced was 0.758:1.

Example 14

The experiment was carried out as described in Example 13, with the exception that the added sodium chloride solution was free from manganese sulfate. About 2.2–2.3 liters sodium chloride solution and about 0.8 liter sulfuric acid were required per hour. In the course of 3 hours 418.5 grams NaClO$_2$, corresponding to a yield of 52.0% calculated on the chlorate used, and 1.142 grams NaCl were obtained. The proportion Cl$_2$:ClO$_2$ in the produced gas was 2.11:1.

Example 15

In a reaction vessel 1.67 liters HCl (about 10 N) were added within 5.84 hours to 5 liters of a sodium chlorate solution containing 138.5 grams NaClO$_3$, 351 grams CaCl$_2$ and 2 grams MnCl$_2$.4H$_2$O per liter. Simultaneously, 1.1 cubic meter air were introduced per hour into the reaction solution having a temperature of 70° C. The gas mixture leaving the reaction vessel was introduced into aqueous sodium peroxide solution in order to determine in usual manner the chlorine dioxide.

554.4 grams NaClO$_2$, corresponding to a yield of 94.3%, calculated on the chlorate used, and 482.2 grams NaCl were obtained. The molar proportion Cl$_2$:ClO$_2$ in the produced gas was 0.672:1.

Example 16

The expirement was carried out as described in Example 15, with the exception that the sodium chlorate solution used only contained 2 grams MnCl$_2$.4H$_2$O per liter and was free from calcium chloride. 2.63 liters HCl (about 10 N) were required which were added within 9 hours. 523 grams NaClO$_2$, corresponding to a yield of 89.0% calculated on the chlorate used, and 566 grams NaCl were obtained. The molar proportion Cl$_2$:ClO$_2$ in the produced gas was 0.837:1.

Example 17

A reaction vessel (capity about 8.0 liters) provided with overflow was charged per hour in doses with 343 cc. of an aqueous chlorate solution of 554.5 grams NaClO$_3$ per liter, 152 cc. H$_2$SO$_4$ of 78% strength and 208 cc. HCl (about 10 N), which contained per liter, 27.8 grams MnSO$_4$.H$_2$O. The chlorine dioxide formed was diluted per hour with 1.5 cubic meters air which were introduced into the liquid. The excess reaction solution flowing off was purged in a second vessel having a capacity of about 3 liters with 0.3 cubic meter air per hour and was then discharged via a siphon. The introduced amounts of air were combined and conducted into sodium peroxide solution in order to determine in usual manner the chlorine dioxide formed. The temperature in the reaction vessel was 69° C. and in the purging vessel 78–80° C. The acid concentration of the reaction liquid was about 3.7–4.0 N and the chlorate concentration was about 14 grams NaClO$_3$/liter in the reaction vessel and about 3–4 grams/liter in the purging vessel.

Within 5 hours 737 grams NaClO$_2$, corresponding to a yield of 90.2% calculated on the chlorate used, and 706 grams NaCl were obtained. The molar proportion Cl$_2$:ClO$_2$ in the produced gas was 0.751:1.

Example 18

The experiment was carried out as described in Example 17, with the exception that the added hydrochloric acid was free from manganese sulfate. 410 cc. hydrochloric acid and 162 cc. sulfuric acid were required per hour. In the course of 5 hours 527 grams NaClO$_2$, corresponding to a yield of 65.4%, and 1.275 grams NaCl were obtained. The molar proportion Cl$_2$:ClO$_2$ in the produced gas was 1.872:1.

I claim:

1. In a process for the manufacture of chlorine dioxide by reducing a compound of the group consisting of alkali metal and alkaline earth metal chlorates with hydrochloric acid in an aqueous solution, the improvement which consists in carrying out the reaction at a temperature in the range from 0 to 100° C., and in the presence of a catalyst of the group consisting of Mn$^{+2}$ ions in an amount between about 0.5 and about 1.5 g. per liter of solution, Ag$^+$ ions in an amount between about 0.02 and about 0.3 g. per liter of solution, and combinations thereof.

2. A process as claimed in claim 1, wherein chloride ions in the form of a salt selected from the group consisting of sodium chloride and calcium chloride, are added in a proportion of 0.5–10 mols per mol of chlorate.

3. A process as defined in claim 1, wherein the reaction is carried out at a temperature between about 20° C. and about 70° C.

4. In a process for the manufacture of chlorine dioxide by reducing a compound of the group consisting of alkali metal and alkaline earth metal chlorates with hydrochloric acid in an aqueous solution, the improvement which consists in carrying out the reaction at a temperature in the range from 0 to 100° C. and in the presence of a catalyst consisting of Ag$^+$ ions in an amount of at least about 0.05 g. per liter of solution.

5. In a process for the manufacture of chlorine dioxide by reducing a compound of the group consisting of alkali metal and alkaline earth metal chlorates with hydrochloric acid in an aqueous solution, the improvement which consists in carrying out the reaction at a temperature in the range from 0 to 100° C. and in the presence of a catalyst consisting of a combination of Mn$^{+2}$ ions in an amount between about 0.5 and about 1.5 g. per liter of solution and Ag$^+$ ions in an amount between about 0.02 and 0.3 g. per liter of solution.

References Cited in the file of this patent

UNITED STATES PATENTS

| | | |
|---|---|---|
| 1,904,190 | Becher | Apr. 18, 1933 |
| 2,317,443 | Cunningham | Apr. 27, 1943 |
| 2,484,402 | Day et al. | Oct. 11, 1949 |
| 2,736,636 | Day et al. | Feb. 28, 1956 |

FOREIGN PATENTS

| | | |
|---|---|---|
| 165,085 | Austria | Jan. 10, 1950 |